US010717955B2

(12) United States Patent
Kornacki

(10) Patent No.: US 10,717,955 B2
(45) Date of Patent: Jul. 21, 2020

(54) METHOD FOR THE SELECTIVE REMOVAL OF SULFITES FROM BEVERAGES AND MODULAR APPARATUS FOR SAME

(71) Applicant: James Richard Kornacki, Chicago, IL (US)

(72) Inventor: James Richard Kornacki, Chicago, IL (US)

( * ) Notice: Subject to any disclaimer, the term of this patent is extended or adjusted under 35 U.S.C. 154(b) by 688 days.

(21) Appl. No.: 14/505,462

(22) Filed: Oct. 2, 2014

(65) Prior Publication Data

US 2015/0093485 A1 Apr. 2, 2015

Related U.S. Application Data

(60) Provisional application No. 61/885,803, filed on Oct. 2, 2013.

(51) Int. Cl.
*C12H 1/052* (2006.01)
*A23L 2/80* (2006.01)
*A23L 2/78* (2006.01)

(52) U.S. Cl.
CPC .............. *C12H 1/0416* (2013.01); *A23L 2/78* (2013.01); *A23L 2/80* (2013.01)

(58) Field of Classification Search
CPC ............ A23L 2/78; A23L 2/80; C12H 1/0416
See application file for complete search history.

(56) References Cited

U.S. PATENT DOCUMENTS 2,962,421 A 11/1960 Johnson
3,685,961 A 8/1972 Grunig
(Continued)

FOREIGN PATENT DOCUMENTS

GB 2100750 A 1/1983
SU 319638 11/1971
(Continued)

OTHER PUBLICATIONS

Heftmann, Chromatography:Fundamentals and Applications of Chromatographic and Electrophoretic Methods, p. A228 1983.*
(Continued)

*Primary Examiner* — Erik Kashnikow
*Assistant Examiner* — Lela S. Williams
(74) *Attorney, Agent, or Firm* — Marshall, Gerstein & Borun LLP

(57) ABSTRACT

The disclosure provides a method for selectively removing sulfites, for example bisulfite anionic species, from a beverage comprising free sulfite by providing an effective amount of a non-ionic, solid phase material and contacting the beverage with the solid phase material thereby sequestering the free sulfite on the non-ionic, solid phase material and providing a beverage having a reduced amount of free sulfite that otherwise maintains the general chemical composition with which it started. The disclosure further provides a device for selectively removing sulfite from a beverage comprising a container for receiving a beverage comprising free sulfite, said container enclosing a non-ionic, solid phase material capable of sequestering free sulfite, and a modular apparatus comprising a sulfite capture module and optionally a sediment filter module or an aeration module. Optionally, the non-ionic solid phase material is food-safe.

21 Claims, 4 Drawing Sheets

(56) References Cited

U.S. PATENT DOCUMENTS

| | | | |
|---|---|---|---|
| 4,196,175 A | | 4/1980 | Jensen |
| 4,370,239 A | | 1/1983 | Jensen |
| 4,440,795 A | | 4/1984 | Goldstein et al. |
| 4,758,351 A | * | 7/1988 | Kern .................... A23L 2/70 |
| | | | 210/688 |
| 4,775,541 A | | 10/1988 | Brown et al. |
| 4,898,742 A | * | 2/1990 | Shrikhande ............. C12G 3/06 |
| | | | 426/271 |
| 5,071,664 A | | 12/1991 | Brown |
| 5,358,732 A | | 10/1994 | Seifter et al. |
| 5,509,349 A | | 4/1996 | Anderson et al. |
| 5,972,402 A | | 10/1999 | Scholl et al. |
| 6,568,660 B1 | | 5/2003 | Flanbaum |
| 6,913,776 B2 | | 7/2005 | Ferrarini |
| 7,198,809 B2 | | 4/2007 | Leonhardt et al. |
| 7,841,584 B2 | | 11/2010 | Sabadicci et al. |
| 8,272,538 B2 | | 9/2012 | Weinberg et al. |
| 8,313,790 B2 | | 11/2012 | Deleuze et al. |
| 8,727,324 B2 | | 5/2014 | Borden et al. |
| 2007/0196546 A1 | | 8/2007 | Tarantino |
| 2008/0041240 A1 | | 2/2008 | Tarantino |
| 2008/0282908 A1 | | 11/2008 | Cole et al. |
| 2011/0024461 A1 | | 2/2011 | Kilduff et al. |
| 2012/0111893 A1 | | 5/2012 | Luebke |
| 2012/0156338 A1 | | 6/2012 | Agarwal et al. |
| 2012/0156345 A1 | | 6/2012 | Agarwal et al. |
| 2013/0122161 A1 | | 5/2013 | Cole et al. |
| 2013/0280374 A1 | | 10/2013 | Catelli et al. |

FOREIGN PATENT DOCUMENTS

| | | |
|---|---|---|
| WO | WO-2005/107479 A1 | 11/2005 |
| WO | WO-2008/067556 A2 | 6/2008 |

OTHER PUBLICATIONS

Rotter, Improved Winemaking, https://web.archive.org/web/20060629065429/http://www.brsquared.org/wine/Articles/SO2/SO2.htm 2006.*
Morethanorganic (http://www.morethanorganic.com/sulphur-in-the-bottle) (Year: 2007).*
Ahmad, et al. New generation Amberlite XAD resin for the removal of metal ions: A review (https://docksci.com/new-generation-amberlite-xad-resin-for-the-removal-of-metal-ions-a-review5a4b0c77d64ab26ab1a9de6d.html) (Year: 2014).*
International Search Report and Written Opinion, International Application No. PCT/US2014/058918, completed Dec. 30, 2014.
Purolite® ECR Brochure, "Application Guide, Purolitee ECR Enzyme Immobilization Resins," pp. 1-10 (May 2013).
Migneault et al., "Glutaraldehyde: behavior in aqueous solution, reaction with proteins, and application to enzyme crosslinking," Biotechniques, 37:790-802 (Nov. 2004).
Barkauskas et al., An investigation of the functional groups on the surface of activated carbons, J. Serb. Chem. Soc., 69(5):363-75 (2004).
Supplementary European Search Report, European patent application No. EP14850933, dated Apr. 20, 2017.
Tosoh Corporation, Toyopearl® Affinity Type Toyopearl AF-Formyl-650M, Instruction Manual (2011).
Lin et al., A biocatalyst for the removal of sulfite from alcoholic beverages, Biotechnol. Bioeng., 89(1):123-7 (2005).
Yin, Organic Chemistry vol. 1, p. 283 (Apr. 30, 2003).
Chinese Patent Application No. 201480054609.5, Search Report, dated Dec. 18, 2019.
Chinese Patent Application No. 201480054609.5, Third Office Action, dated Dec. 30, 2019.

* cited by examiner

METHOD FOR THE SELECTIVE REMOVAL OF SULFITES FROM BEVERAGES AND MODULAR APPARATUS FOR SAME

CROSS-REFERENCE TO RELATED APPLICATIONS

The benefit under 35 U.S.C. §119(e) of U.S. Provisional Patent Application Ser. No. 61/885,803, filed Oct. 2, 2013, is hereby claimed, and the disclosure thereof is hereby incorporated herein by reference.

FIELD OF THE DISCLOSURE

The disclosure relates generally to a method of removing free sulfite from a beverage comprising free sulfite and related device and assembly. More particularly the disclosure relates to a method of removing free sulfite from a beverage comprising free sulfite by contacting the beverage with an effective amount of a non-ionic solid phase material capable of sequestering free sulfite.

BRIEF DESCRIPTION OF RELATED TECHNOLOGY

Sulfites are a common food additive, and a pervasive constituent of wine. All grape wines contain sulfites as a natural byproduct of fermentation, but the majority of sulfites are added prior to bottling. Sulfite salts are dissolved in wine as a preservative and bacteriostatic agent. Owing to their antioxidant capacity, sulfites protect against oxidative damage and allow wine to properly age. Excess sulfites, however, impart an undesirable taste and may pose severe health risks. Many consumers report adverse reactions to sulfite exposure, and sulfite allergies are common, especially among asthmatics.

It is known in the art to employ ion exchange resins to remove sulfites from wine, for example, as described in U.S. Pat. No. 5,071,664, U.S. Pat. No. US 2008/0041240, and U.S. Pat. No. US 2007/0196546 A1. However, ion exchange methods indiscriminately adsorb a wide range of chemical compounds and make such an approach inappropriate for beverages like wine, because removal of non-sulfite compounds is undesirable. Further, ion exchange methods introduce displaced counter-ions into the beverage. Such counter-ions are generally not intended to be included in the beverage and can alter properties of the beverage such as color, level of sedimentation, carbonation, and pH. In some cases, ion exchange methods can significantly alter the pH of the treated fluid. For example, as described in U.S. Pat. No. 5,071,664, anionic ion exchange resins used to remove sulfite from wine have been shown to raise the pH of the wine from a typical wine pH of about 2.5 to 4.5 up to about 11.0. Accordingly, wines treated with such a resin must be adjusted down for drinkability and safety, which, undesirably, introduces an additional processing step into the sulfite removal process.

The addition of hydrogen peroxide has been suggested as a method of removing free sulfites from wine, for example, in the commercial product $SO_2GO$®. However, hydrogen peroxide is a non-specific oxidizing agent and the addition of hydrogen peroxide to wine can disadvantageously oxidize desirable non-sulfite compounds, thereby negatively affecting the taste of the wine.

Biocatalytic methods have also been used to oxidize sulfites in wine to sulfates as shown, for example, in Lin et. al., *A Biocatalyst for the Removal of Sulfite from Alcoholic Beverages*, Biotechnol Bioeng., 89(1), pp. 123-7 (January 2005). However, the biocatalytic method is inefficient, taking 3 hours to treat a commercial 750 mL bottle of wine. Further, optimum sulfite conversion using the biocatalytic method was observed at pH 8.5, much more basic than the natural pH of most wines, about 2.5-4.5. Thus, wines treated by the biocatalytic method also must be adjusted down for drinkability and safety, which, undesirably, introduces an additional processing step into the sulfite removal process.

Further, some believe that sulfites can be removed from wine by decanting or aerating the wine. Theoretically, decanting or aerating is believed to alter the sulfite level in a wine because upon exposure to the atmosphere the sulfites will be oxidized. Although oxidation of sulfites by the atmosphere may occur, this happens at a slow rate and leaves important flavor compounds susceptible to oxidative degradation. Importantly, not all wines are enhanced by simply decanting or aerating the wine because too much exposure to oxygen, in particular the amount necessary to oxidize sulfites, can adversely alter the flavor of the wine and are not suitable for all wines.

Often, wine is enhanced with entrained air through an aeration device, such as those disclosed in U.S. Pat. No. US 2012/0156338 A1 and U.S. Pat. No. 7,841,584 B2, which are hereby incorporated by reference. Aerators are used to soften tannins and improve taste but, as described above, are not capable of eliminating sulfites.

Oenophiles generally agree that different wines require different preparative approaches to attain the peak possible experience. However, all wines naturally contain sulfites and would benefit from the removal of sulfites.

BRIEF SUMMARY OF THE INVENTION

This disclosure relates to enhancement of a beverage comprising free sulfites, including but not limited to wine. Particularly, it refers to a method for the selective removal of free sulfite from a complex fluid beverage. Further, it discloses a sulfite removal device and a modular assembly comprising a sulfite capture component in addition to an optional fining, or sediment, filter component and/or an aeration component.

The disclosure provides a method for selectively removing free sulfite, for example bisulfite anionic species, from a beverage comprising free sulfite by sequestration of the free sulfite on a solid phase material. In one embodiment, the method comprises providing an effective amount of a non-ionic, solid phase material and contacting the beverage with the non-ionic, solid phase material thereby sequestering the free sulfite on the non-ionic, solid phase material and providing a beverage having a reduced amount of free sulfite that otherwise maintains the general chemical composition with which it started (i.e., non-sulfite components are retained in the beverage, and the pH of the beverage is not appreciably altered). Optionally, the non-ionic solid phase material can be food-safe.

In a related aspect, the disclosure provides a device for selectively removing sulfite species from a beverage, the device comprising a container for receiving a beverage comprising free sulfite, said container enclosing a non-ionic, solid phase material capable of sequestering free sulfite from the beverage comprising free sulfite. In one embodiment, the beverage comprising free sulfite is wine. Optionally, the device can be adapted to be received by an assembly for the removal of free sulfite from a beverage comprising free sulfite. Further optionally, the non-ionic, solid phase material can be food-safe.

In a further related aspect, the disclosure advantageously provides an assembly for removing free sulfite from a beverage comprising free sulfite, the assembly comprising a sulfite capture module and at least one of a sediment filter module or an aeration module, the sulfite capture module comprising a non-ionic, solid phase material capable of sequestering free sulfite from the beverage comprising free sulfite, the receptacle having an entrance and an exit such that the beverage can flow through the receptacle. In some embodiments, the sulfite capture module provides a receptacle including the non-ionic solid phase material capable of sequestering free sulfite from the beverage comprising free sulfite. In other embodiments, the sulfite capture module provides a receptacle including a container for receiving a beverage comprising free sulfite, the container enclosing a non-ionic solid phase material capable of sequestering free sulfite from the beverage comprising free sulfite, the receptacle having an entrance and an exit such that the beverage can flow through the receptacle. In embodiments, the modular assembly comprises the sediment filter module and optionally an aeration module. In further embodiments, the assembly comprises the aeration module and optionally a sediment filter module. In some embodiments, the assembly comprises a sulfite capture module, a sediment filter module, and an aeration module together or in any combination thereof. Optionally, in any of the aforementioned embodiments, the non-ionic solid phase material can be a food-safe solid phase material. Described generally, these functions are housed as independent modules that can be combinatorially assembled to best treat any specific beverage, particularly wine, so as to provide the most desirable drinking experience. Thus, a modular assembly according to the invention can advantageously provide consumers with an assembly containing a sulfite capture module capable of removing sulfites from a beverage containing sulfites, while optionally further including a sediment filtration module capable of sediment filtration and/or an aeration module capable of entraining air, thereby allowing consumers the option to determine and implement an appropriate treatment through variable assembly and/or actuation of the device.

Advantageously, embodiments of the methods, devices and assemblies disclosed herein quickly and efficiently remove free sulfite compounds without removing other desirable components of a beverage, while further providing filtration and aeration as needed.

DETAILED DESCRIPTION

Figure 1:
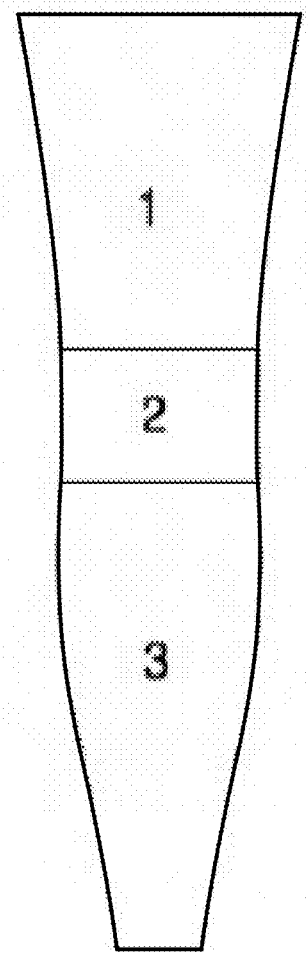
FIG. 1. Flat representation of fully assembled assembly including a sulfite capture module (module 1), a sediment filtration module (module 2), and an aeration module (module 3).

The disclosure relates to enhancement of a beverage, including but not limited to wine. Particularly, it refers to a method, device, and assembly for the removal of free sulfites from a beverage comprising free sulfites. The disclosure provides a method for selectively removing free sulfite, for example bisulfite anionic species, from a beverage comprising free sulfite by sequestration of free sulfite on a non-ionic, solid phase material. In one aspect, the method comprises providing an effective amount of a non-ionic, solid phase material and contacting the beverage comprising free sulfite with the non-ionic, solid phase material thereby sequestering the free sulfite on the non-ionic, solid phase material and providing a beverage having a reduced amount of free sulfite that otherwise maintains the general chemical composition with which it started (i.e. non-sulfite components are retained in the beverage, and the pH of the beverage is not appreciably altered). Optionally, the beverage comprising free sulfite is wine. Further optionally, the non-ionic solid phase material can be a food-safe solid phase material. In embodiments, contacting the beverage with the non-ionic, solid phase material comprises allowing the beverage comprising free sulfite to flow through the non-ionic, solid phase material. In some embodiments, contacting the beverage with the non-ionic solid phase material comprises submerging the non-ionic solid phase material in the beverage comprising free sulfite. Optionally, the non-ionic solid phase material can be enclosed in a container such as a tea sachet and the container can be submerged in the beverage comprising free sulfite to be treated.

As used herein, the term "food-safe" includes, but is not limited to, materials that are designated as "Generally Recognized as Safe" (GRAS) by the United States Food and Drug Administration (US FDA), materials listed in 21 USC § 176.170, materials listed in 21 USC § 173.357 and/or materials with assigned, allowable E-numbers in the European Union, and/or components that are not yet designated as GRAS or E-numbered but have been demonstrated as safe for human consumption in the amounts proposed for use herein. "Food-safe" materials further include the reaction product of two or more materials that would be considered food-safe under the aforementioned definition. "Food-safe" does not include materials that are listed in Part A of Annex III to Regulation (EC) No 1334/2008 concerning substances that shall not be added to food. All regulations and policy statements cited herein are hereby incorporated by reference in their entirety.

As used herein, the term "effective amount" is intended to refer to the amount of non-ionic, solid phase material needed to reduce the amount of free sulfite in a beverage comprising free sulfite to less than 10 ppm. One of ordinary skill in the art will readily appreciate that the amount of non-ionic, solid phase material that is effective will depend on factors such as the volume of beverage comprising free sulfite to be treated, the method of contacting the beverage comprising free sulfite with the non-ionic, solid phase material (e.g., flowing the beverage through the material or submerging the material in the beverage), the pH of the beverage to be treated, the surface area, porosity, and sulfite sequestration loading capacity of the solid phase material, the viscosity of the beverage comprising free sulfite, and the initial concentration of free sulfite in the beverage comprising free sulfite to be treated.

As used herein, with respect to a change in pH of a beverage having a reduced amount of free sulfite, relative to the pH of the beverage prior to free sulfite removal, "appreciably alter(ed)" refers to a pH change of no greater than about ±0.15, about ±0.12, about ±0.10, about ±0.09, about ±0.08, about ±0.07, about ±0.06, or about ±0.05 pH units.

As used herein, the term "beverage" is intended to refer to any liquid that is intended for consumption by human beings. Beverages contemplated for use with the assemblies and methods according to the disclosure include, but are not limited to, fermented alcoholic beverages, fermented non-alcoholic beverages (such as sparkling wines), and non-fermented beverages.

As used herein, the terms "sequester(s)", "sequestration", "sequestering" and other iterations of "sequester" as used herein, are intended to refer to the covalent adsorption of a free sulfite to a non-ionic solid phase material. Without intending to be bound by theory, it is believed that the covalent adsorption of free sulfite proceeds by forming a covalent bisulfite-carbonyl adduct with a carbonyl-functionalized non-ionic, solid phase material. As used herein, "covalent adsorption" refers to the formation of covalent bonds which are generally understood to refer to a bond in which electrons are shared. Such bisulfite-carbonyl adduct covalent bonds are generally not considered to be reversible under conditions in which they were formed, although under certain conditions the starting material (i.e., the material that existed before covalent bond formation) can be regenerated by the addition of an appropriate reactant. Ionic attachment/adsorption of free sulfite to the non-ionic solid phase material is excluded (at least because the solid-phase material is non-ionic). As used herein, "ionic attachment" or "ionic adsorption" refers to the interaction between a charged ion and a charged resin that is reversible. For example, with respect to a cation exchange resin, the interaction is typically reversible at least upon addition of a solution containing a higher valence ion.

The disclosure provides an effective method of removing free sulfites from a beverage comprising free sulfite, like wine, in order to enhance the overall flavor, composition, and experience for consumers and to broaden that experience to sulfite conscious consumers. No prior attempt to remove free sulfite from beverages comprising free sulfite, such as wine, has resulted in a process that safely and efficiently removes free sulfite without altering the characteristics, including flavor, color, pH, sedimentation and/or chemical makeup, of the beverage. Advantageously, embodiments disclosed herein quickly, efficiently, and selectively remove free sulfite compounds without removing other desirable components of a beverage. The methods disclosed herein preferentially remove free sulfite from beverages comprising free sulfites by sequestering free sulfite on a non-ionic, solid phase resin material. As used herein, the term "sulfites" refers to the salts of sulfurous acids ($M_2S_2O_3$), acid-sulfites or bisulfites ($MHSO_3$), sulfur dioxide ($SO_2$), metabisulfites ($M_2SO_5$), hydrosulfites ($M_2S_2O_4$), combinations thereof and the like, wherein M represents a cationic counter-ion comprising one or more metals or non-metals.

As used herein, "selectively" refers to the preferential adsorption of free sulfite to the non-ionic solid phase resin over other ions present in solution.

As used herein, "free sulfites" refers to sulfites that are in the beverage but not chemically bound to the aldehydes, spoilage organisms such as bacteria and yeast, and solids such as oak, tannins, sugars, yeast, fining agents, etc.

In a related aspect, the disclosure provides a device for selectively removing free sulfite from a beverage comprising free sulfite, the device comprising a container for receiving a beverage comprising free sulfite, said container enclosing a non-ionic, solid phase material capable of sequestering free sulfite from the beverage comprising free sulfite. In one embodiment, the beverage is wine. In embodiments, the non-ionic solid phase resin is a food-safe solid phase resin. Optionally, the device can be adapted to be received by an assembly for the removal of free sulfite from a beverage comprising free sulfite. In embodiments, the container can be a porous container such that the beverage comprising free sulfite can flow through the container. In other embodiments, the container provides a receptacle for receiving the beverage comprising free sulfite, the receptacle having an entrance and an exit such that the beverage comprising free sulfite can flow through the container.

In a further related aspect, the disclosure provides an assembly for removing free sulfite from a beverage comprising free sulfite, the assembly comprising a sulfite capture module and at least one of a sediment filter module or an aeration module, the sulfite module comprising a non-ionic, solid phase material capable of sequestering free sulfite from the beverage comprising free sulfite. In some embodiments, the sulfite capture module provides a receptacle for receiving a non-ionic solid phase material capable of sequestering free sulfite from the beverage comprising free sulfite, the receptacle having an entrance and an exit such that the beverage can flow through the receptacle. In other embodiments, the sulfite capture module provides a receptacle including a container for receiving a beverage comprising free sulfite, the container enclosing the non-ionic, solid phase material capable of sequestering free sulfite from the beverage comprising free sulfite, the receptacle having an entrance and an exit such that the beverage can flow through the receptacle. In one embodiment, the beverage is wine. In embodiments, the assembly comprises the sediment filter module and optionally a aeration module. In a further embodiment, the assembly comprises an aeration module, and optionally a sediment filter module. In another embodiment, the assembly comprises a sulfite capture module, a sediment filter module, and an aeration module together or in any combination thereof. Optionally, in any of the aforementioned embodiments, the non-ionic solid phase material can be a food-safe solid phase resin. Described generally, these functions are housed as independent modules that can optionally be combinatorially assembled to best treat any specific beverage, particularly wine, so as to provide the most desirable drinking experience.

Advantageously, embodiments of the devices or assemblies disclosed herein quickly and efficiently selectively remove free sulfite compounds without removing other desirable components of a beverage while providing filtration and aeration as needed.

The solid phase material that sequesters free sulfite comprises a non-ionic, solid phase material. Suitable solid phase materials may include, but are not limited to, non-ionic polymers that are carbonyl-functionalized. As used herein, "carbonyl-functionalized" refers to a material that provides carbonyl groups at the surface of the material. Additional suitable solid phase materials that provide carbonyl groups at the surface of the material include, but are not limited to, non-ionic polymers that have be modified so as to be carbonyl-functionalized. Further additional suitable solid phase materials include, but are not limited to, ionic polymers that have been modified so as to be non-ionic and that are carbonyl-functionalized, either naturally or have been modified to provide carbonyl groups at the material surface.

Suitable solid phase materials comprising non-ionic solid phase materials that are carbonyl functionalized include, but are not limited to polyacrylate, polyalkylacrylate, modified polystyrene and polyacrolein based resins. Commercially available carbonyl-functionalized resins for specialty chemical applications include, but are not limited to, Toyopearl™ AF-Formyl-650 (a methacrylic polymer providing aldehyde groups on the material surface, available from TOSOH Bioscience LLC, King of Prussia, Pa.), Stratospheres™ PL-CHO (polymer supported cross-linked benzaldehyde resin, available from Varian, Inc through SigmaAldrich), and Formylpolystyrene (a formyl modified polystyrene available from SigmaAldrich). None of Toyopearl AF-Formyl-650, Stratospheres PL-CHO, or Formylpolystyrene is classified as food safe but are suitable for use as non-ionic solid phase material for free sulfite sequestration, particularly if prepared in a food-safe way.

Suitable solid phase materials comprising non-ionic solid phase materials that can be modified to provide carbonyl groups at the material surface include, but are not limited to, cellulose resins or membranes, chitosan resins or membranes, and chloromethyl resins (i.e., Merrifield resins) based materials. Commercially available Merrifield resins include, Merrifield's peptide resin (a chloromethylated polystyrene, available from SigmaAldrich,) Poly(ethylene glycol)-co-Merrifield resin (a chloromethylated polystyrene copolymerized with poly(ethylene glycol), available from SigmaAldrich), and KiOmedine-CSU® (an ultra-pure chitosan, available from KitoZyme, S.A, through SigmaAldrich), Such alcohol and/or halide-terminated materials can be carbonyl functionalized by mild oxidation of the alcohol or halide.

Suitable solid phase materials comprising ionic solid phase materials that can be modified to be non-ionic and which provide carbonyl groups at the material surface include, but are not limited to, polyacrylates, polymethacrylates, and carboxylate functionalized resins, including but not limited to Diaion™ WK10 (available from Mitsubishi Chemical Corporation, Tokyo, Japan) or Purolite® C107 (available from Purolite Corporation, Bala Cynwyd, Pa.). Such resins can be partially reduced to an aldehyde thereby forming a non-ionic solid phase material.

Suitable solid phase materials comprising ionic solid phase materials that can be modified to be non-ionic and which can be modified to provide carbonyl groups at the material surface include, but are not limited to, polyacrylates, resins having primary amine functionalities at the material surface, and combinations thereof. Suitable resins having primary amine functionalities at the material surface include, but are not limited to weakly basic anion exchange resins such as, Purolite® resins (available from Purolite Corporation, Bala Cynwyd, Pa.) and Diaion™ resins (available from Mitsubishi Chemical Corporation, Tokyo, Japan) including but not limited to, Purolite® ECR8310M, Purolite® ECR8417M, Purolite® 8405M and Purolite® ECR8319M (amino functionalized methacrylate resins), and Diaion™ WA20, and Diaion™ WA21J (amino functionalize polystyrene resins). As demonstrated in the examples, below, the modification to prepare a carbonyl-functionalized solid phase material can be prepared by amination or reductive amination of a commercially available primary amine resin with a dialdehyde compound.

As used herein, the term "carbonyl" is intended to include electrophilic carbonyls including, but not limited to, aldehydes, ketones, acetals, ketals, carboxylic acids, esters, amides, acid anhydrides, and imides, but does not include ionic species such as carboxylate anions.

The surface of the solid phase material can be highly porous, generally comprising pores between hundreds and thousands of angstroms, thereby displaying a high surface area per weight, generally exceeding about 10 $m^2/g$, about 20 $m^2/g$, about 30 $m^2/g$, or about 40 $m^2/g$. Such porous materials that provide, or are modified to provide, carbonyl functionality offer an extraordinarily high loading capacity for free sulfite sequestration, generally in excess of about 0.1 milliequivalents of sulfite per gram of solid phase material (meq/g), about 0.5 meq/g, about 1 meq/g, about 2 meq/g, or about 3 meq/g.

Surface chemistry modifications can include any carbonyl group as free sulfite forms adducts, and is thus sequestered, within many carbonyl contexts. In embodiments, the carbonyl is a reactive carbonyl selected from the group consisting of unhindered electrophilic aldehydes, unhindered electrophilic ketones, acetals, ketals, and combinations thereof. Suitable dialdehydes for use in the amination of a primary amine resin include, but are not limited to, glutaraldehyde, dialdehyde sucrose, dialdehydes of the formula CHO—$(CR_2)_n$—CHO wherein R is any atom or group and n is a nonzero integer, and combinations thereof. Advantageously, the carbonyl can be selected so as to be antimicrobial and/or resistant to oxidation. Without intending to be bound by theory, it is believed that glutaraldehyde is naturally antimicrobial and additionally, it is believed that glutaraldehyde can form short-chain acetal polymers, wherein the acetal is naturally less susceptible to oxidation than the aldehyde. Accordingly, solid phase materials that are carbonyl-functionalized using glutaraldehyde provide antimicrobial characteristics to the non-ionic solid phase material as well as provide a carbonyl-functionalized solid phase material that is stable to the atmosphere.

As described above, the methods for the removal of free sulfite from a beverage comprising free sulfite include contacting the beverage comprising free sulfites with an effective amount of a non-ionic, solid phase material. Modest quantities of such solid phase materials (0.10-5.00 g) can effectively capture, or sequester, free sulfites, which generally range from 10-350 ppm per bottle of wine (750 mL). Suitable effective amounts of the dry, non-ionic solid phase materials for treating about 750 mL of a beverage having a pH in the range of about 2.5 to about 4.5 and a free sulfite concentration in the range of about 10 ppm to about 350 ppm to provide a beverage having a free sulfite concentration of less than 10 ppm are amounts in the range of about 0.10 g to about 5.00 g, or about 0.10 g to about 4.00 g, or about 0.10 g to about 3.00 g, or about 0.10 g to about 2.00 g, or about 0.10 g to about 1.00 g, or about 0.10 g, about 0.20 g, about 0.30 g, about 0.40 g, about 0.50 g, about 0.60 g, about 0.70 g, about 0.80 g, about 0.90 g, about 1.00 g, about 1.50 g, about 2.00 g, about 2.50 g, about 3.00 g, about 3.50 g, about 4.00 g, about 4.50 g, or about 5.00 g, when the beverage comprising the free sulfites gravimetrically flowed through the non-ionic solid phase material, or the non-ionic, solid phase material is submerged in the beverage (e.g., when the non-ionic, solid phase material is enclosed in a tea sachet that is placed in the beverage). Further, the carbonyl-functionalized non-ionic, solid phase material can be regenerated in a manner by the application of sodium bicarbonate solution and reused. Suitable effective amounts of the dry, non-ionic, solid phase material for treating about 50 ml to about 250 ml of beverage having a pH in the range of about 2.5 to about 4.5 and a free sulfite concentration in the range of about 10 ppm to about 200 ppm, about 10 ppm to about 150 ppm, about 10 ppm to about 100 ppm, about 10 ppm to about 75 ppm, about 10 ppm to about 50 ppm, about 10 ppm to about 40 ppm, about 15 ppm to about 35 ppm, or about 25 ppm, to provide a beverage having a free sulfite concentration of less than 10 ppm are amounts in the range of about 0.20 g to about 2.00 g, about 0.50 g to about 1.90 g, about 1.00 g to about 1.80 g, about 1.20 g to about 1.80 g, about 1.40 g to about 1.80 g, or about 1.40 g, about 1.45 g, about 1.50 g, about 1.55 g, about 1.60 g, about 1.65 g, about 1.70 g, about 1.75 g, or about 1.80 g, when the beverage comprising the free sulfite is gravimetrically flowed through the non-ionic, solid phase material, or the non-ionic, solid phase material is submerged in the beverage (e.g., when the non-ionic, solid phase material is enclosed in a tea sachet that is placed in the beverage).

As used herein, the term "contacting" includes but is not limited to any of flowing a beverage comprising free sulfite through the non-ionic, solid phase material (e.g., when the non-ionic, solid phase material is enclosed in a container for receiving a beverage) or submerging the non-ionic, solid phase material in the beverage comprising free sulfite (e.g., when the non-ionic, solid phase material is enclosed in a container for receiving a beverage). Non-limiting examples of submerging the non-ionic, solid phase material in a beverage include, submerging a tea sachet enclosing the non-ionic, solid phase material in a beverage and swirling a porous stir wand enclosing the non-ionic, solid phase material and a beverage.

The major components of wine are water and ethanol, with minor amounts of other chemical species from grape fermentation along with additives and stabilizers. Without intending to be bound by theory, it is believed that a significant amount of the chemical compounds present in wine are ionic compounds, like organic acids, which comprise approximately 0.4% of wines on average. Accordingly, although ion exchange resins can adsorb sulfites from wine, such resins also indiscriminately adsorb a wide range of non-sulfite compounds, potentially altering the general chemical composition of the wine, thereby altering the taste, appearance, and overall experience.

Further, without intending to be bound by theory, it is believed that a non-ionic solid phase material that provides carbonyl groups at the material surface can preferentially sequester free sulfite, particularly bisulfite, due to the highly nucleophilic character of the bisulfite and the favored kinetic interaction(s) with carbonyl. Thus, for a beverage that comprises sulfite but is otherwise comprised of weak nucleophilic or ionic compounds, such as wine, the non-ionic solid phase material is able to selectively remove sulfite without disrupting the content of other, desirable, components of the beverage.

Sulfites exist naturally in all fermented wines and are added secondarily in the form of sodium or potassium metabisulfite. The acidic pH of wine (pH≈2.5-4.5) dictates that dissolved sulfites exist almost exclusively as the bisulfite anion ($HSO_3^-$). Covalent addition products, or adducts, form spontaneously between bisulfite ions and carbonyl species yielding stable hydroxysulfonic acids. This reaction is rapid and goes to completion at temperatures common to wine (4° C.-25° C.). Importantly, the kinetic and thermodynamic favorability of carbonyl-bisulfite adduction products precludes non-specific or unintended reactions with other types of compounds.

As used herein, with respect to a change in the pH of a beverage relative to the pH of the beverage prior to sulfite removal, "appreciably alter(ed)" refers to a pH change of no greater than about ±0.15, about ±0.12, about ±0.10, about ±0.09, about ±0.08, about ±0.07, about ±0.06, or about ±0.05 pH units. Without intending to be bound by theory, it is believed that at the pH of wine, sulfite species are predominately in the form of bisulfite, which is a weakly acidic species. It is further believed that as the bisulfite is sequestered by the non-ionic solid phase material, the equilibrium of the sulfite species shifts according to Le Chatelier's principle to form further bisulfite which can then be sequestered by the non-ionic solid phase material. Accordingly, without intending to be bound by theory, it is believed that the small change in pH observed upon removal of free sulfite is due to the removal of the weakly acidic bisulfite species.

The methods disclosed herein selectively sequester, or capture free sulfite, without removing other desirable compounds, by contacting a beverage with a non-ionic, solid phase material, thereby retaining free sulfites from the beverage on the solid phase material, wherein the solid phase material is maintained separate from the beverage. As used herein, "maintained separate" means the non-ionic, solid phase material is enclosed within a container such that the solid phase material is not admixed with the beverage (i.e., the beverage would not need to be decanted/filtered to separate the solid phase material from the beverage).

The device for the removal of free sulfite from a beverage comprising free sulfite disclosed herein comprises a container for receiving a beverage comprising free sulfite, said container enclosing a non-ionic, solid phase material capable of sequestering free sulfite from the beverage comprising free sulfite. In embodiments, the container can be a porous receptacle such that the beverage comprising free sulfite can flow through the container. As used herein, a "container for receiving a beverage" includes containers that maintain their structure when a beverage is poured into the container (i.e., the container could enclose the beverage) as well as containers that do not maintain their structure when a beverage is poured into the container (i.e., a flexible pouch or tea sachet). Further, as used herein, "receiving a beverage" means that the beverage can enter the container and thereby come in contact with the non-ionic solid phase resin enclosed in the container.

Figure 6A:
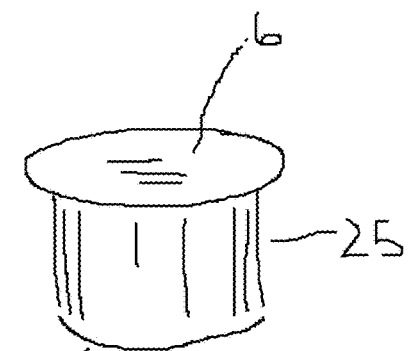
FIG. 6A-D. Rendering of devices comprising a container for receiving a beverage comprising free sulfite that encloses a non-ionic, solid phase material.
Figure 6B:
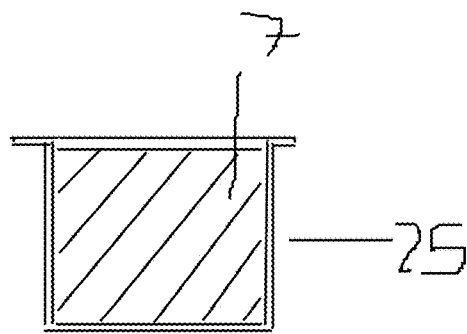
Figure 6D:
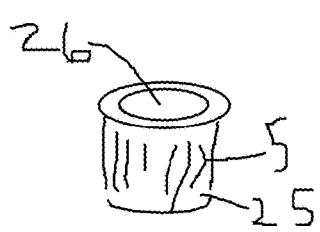

Further as illustrated in FIG. 6D, in embodiments, the container 25 of the devices 5 can provide a receptacle 26 defined by the interior of the container for receiving a beverage comprising free sulfite, the receptacle having an entrance (not shown) and an exit (not shown) such that the beverage comprising free sulfite can flow through the container.

The container of the device is used to maintain separation of the non-ionic, solid phase resin from the beverage to be treated can be any suitable container that allows contact of the beverage comprising free sulfite with the solid phase material, but retains the solid phase material within the housing. In embodiments, the non-ionic, solid phase material may be contained in any hollow structure containing a grating, or mesh, such as a sieve, frit, porous polymer membranes or synthetic mesh, such as nylon mesh, or filter paper with appropriate properties and dimensions to permit fluid flow and prevent resin loss. As used herein, the term "filter paper" includes materials formed from cellulose, abaca fibers, other paper pulps including but not limited to softwood, hardwood, fiber crop, and mineral fibers, and combinations of the foregoing. For the purpose of treating beverages, one embodiment would include a hollow container having a grating or mesh on at least one, or at least two sides of the container to allow a beverage to enter and exit the container. Optionally, one side of container can be open or can be opened by a user, to allow a beverage to enter the container. In refinements, the hollow container can be made of a porous material such as a nylon mesh that can be placed in a beverage. Optionally, the hollow container is a tea sachet. As used herein, "tea sachet" refers to any pouch or packet that can enclose the non-ionic solid phase material such that the solid phase material is maintained separate from the beverage being treated. The tea sachet can be made of any suitable material that retains the non-ionic solid phase material but allows a beverage to permeate the material. Suitable materials include, but are not limited to, filter paper, nylon, silk, soilon, and other synthetic mesh or paper suitable with suitable properties for treating beverages.

The container can be of any shape or dimensions, such as a cylindrical container or a tea sachet. As a non-limiting example, such as that illustrated in FIG. 6A, a cylindrical container 25 can be such that at either or both of the circular ends 6 is a grating composed of any material that permits fluid flow, retains the solid phase material, and will not degrade in the beverage, including but not limited to materials comprising porous polymer membranes. Of course the container need not be cylindrical but can be any shape that allows a beverage to come in contact with the non-ionic, solid phase material, including but not limited to, cylindrical, spherical, circular, hemispherical, quadrilateral, tetrahedral, triangular and/or funnel shaped. In some embodiments, such as that illustrated in FIG. 6B, the container 25 can be such that the body of the container 7 is a porous container composed of any material that permits fluid flow, retains the solid phase material, and will not degrade in the beverage, including but not limited to materials comprising synthetic mesh and filter paper, such as a tea sachet. Of course, the container need not be square or rectangular, but can be any shape that allows a beverage to come in contact with the non-ionic, solid phase material, including but not limited to cylindrical, spherical, circular, hemispherical, quadrilateral, tetrahedral, triangular and/or funnel shaped.

Figure 6C:
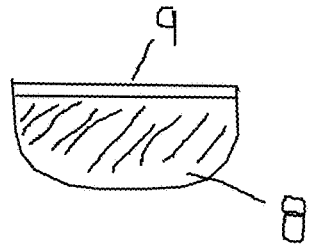

The beverages exiting the disclosed containers have a reduced amount of free sulfite but retain the general non-sulfite compounds, including but not limited to ethanol, glycerol, organic acids, inorganic ions, tannins, phenols, anthaocyanins, flavanols, and oligomers thereof. In embodiments, a container encloses an effective amount of a non-ionic, solid phase material to reduce the amount of free sulfite in one 750 ml bottle of wine to less than 10 ppm. In further embodiments, one container encloses an effective amount of non-ionic, solid phase material to reduce the amount of free sulfite in one glass of wine, for example from about 3 to about 10 oz (about 90 to 300 ml), about 4 to 8 oz (about 120 to about 240 ml), about 5 oz (about 150 ml), and/or about 6 oz (about 180 ml) of wine, to less than 10 ppm. In embodiments, the container enclosing an effective amount of non-ionic solid phase material to treat one glass of wine is a tea sachet. In such embodiments, the tea sachet-type container can be placed in a glass of wine to treat the wine or can be used as a filter cake wherein the wine to be treated is poured through the tea sachet containing the non-ionic, solid phase material. In other embodiments, the container enclosing an effective amount of non-ionic solid phase material to treat one glass of wine is a non-porous container in which an entrance and an exit is provided such that a beverage can flow through the container while retaining the solid phase material. In further embodiments, the container may comprise a combination of a nonporous housing having an entrance and an exit and a tea sachet such that the container is, for example as illustrated in FIG. 6C, a hemispherical synthetic mesh 8 having a flat, nonporous top surface 9 having an entrance provided such that a beverage can flow through the container. Advantageously, in embodiments, the beverage exiting the housing can be practically devoid of free sulfite. As used herein, "practically devoid of sulfites" refers to a free sulfite concentration of about 0 to about 10 ppm as determined by the aeration-oxidation method for sulfite quantitation, described below.

Optionally, the containers for receiving a beverage can be adapted to be received by a sulfite capture module of a modular assembly. A container for receiving a beverage adapted to be received by a sulfite capture module of a modular assembly is a container having suitable dimensions such that it can be placed into the sulfite capture module of the assembly and permit fluid flow, while retaining the non-ionic solid phase material.

Figure 3:
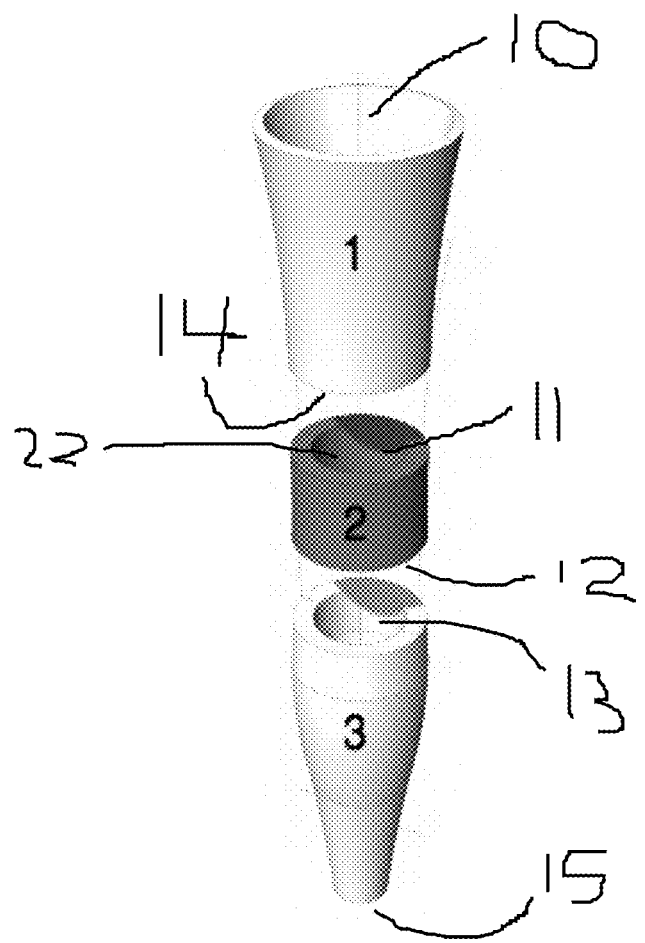
FIG. 3. Contour rendering of separated sulfite capture, sediment filtration, and aeration module components.
Figure 4:
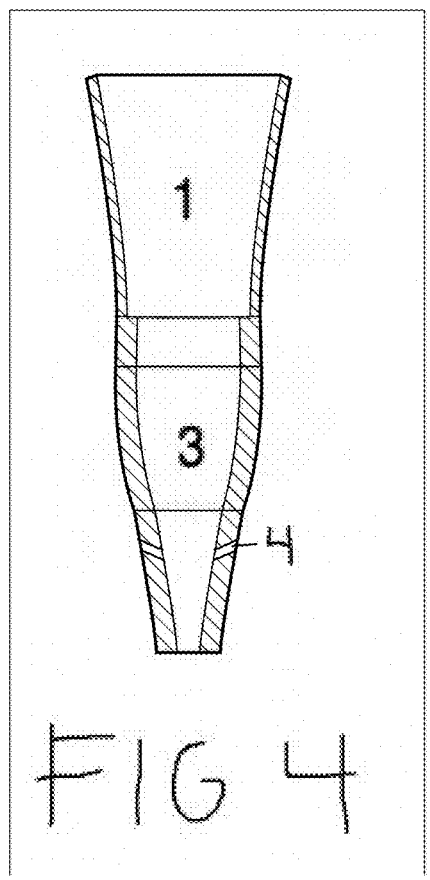
FIG. 4. Alternative assembly using modules 1 and 3.

The assembly for the removal of free sulfite from a beverage disclosed here comprises a modular assembly for free sulfite removal and enhancement of beverages, including a sulfite capture module and at least one of a sediment filtration module or aeration module, as needed, wherein the sulfite capture module comprises a non-ionic solid phase material capable of sequestering free sulfite from the beverage comprising free sulfite. Optionally, the assembly includes a sulfite capture module as well as a sediment filtration module and an aeration module. Generally, as illustrated in FIG. 3, a beverage is poured through a top orifice 10 of the modular assembly and flows downward through an optional sediment filter module 1, the sulfite capture module 2, and finally, optionally, through an aeration module 3. Modules can be separated (FIG. 3) and used individually or recombined in any combination (FIG. 4). Modules may be composed of any material, preferably food grade plastics or metals.

Figures 5A, 5B, 5C, 5D, 5E, 5F:
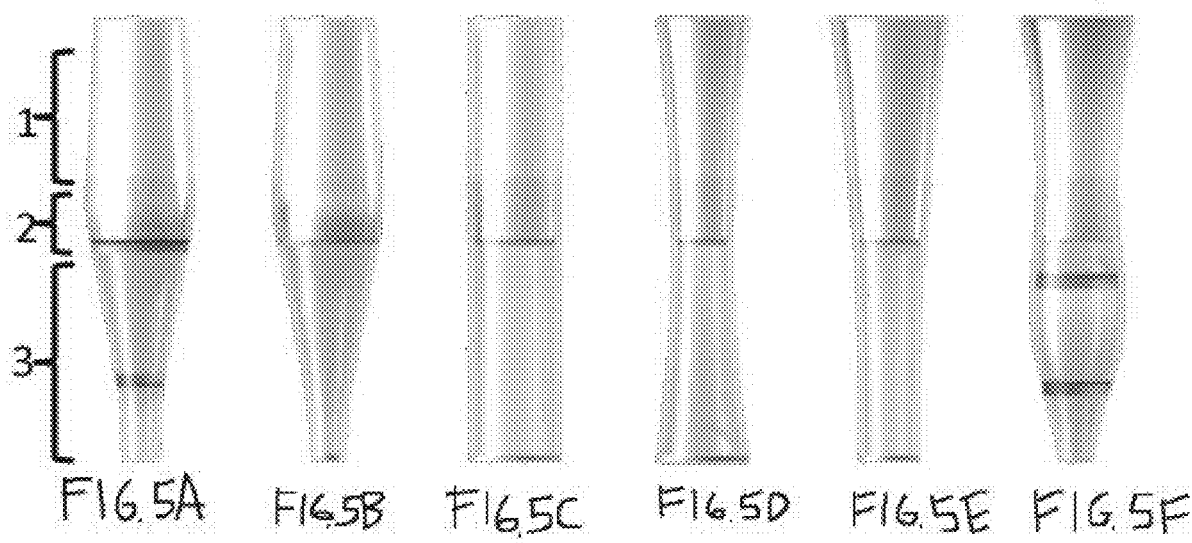
FIG. 5A-F. Alternative shapes for fully assembled device including a sulfite capture module (module 1), a sediment filtration module (module 2), and an aeration module (module 3).

Module 1 serves primarily as a sediment filter and, when combined with module 2 and/or module 3, initial repository for poured beverages to provide backpressure through the remaining modules. In one embodiment, module 1 has a funnel-like shape to direct fluid through a large top orifice with dimensions reasonable to accept a poured beverage and direct said beverage through a mesh filter (not shown) composed of any reasonable material. In another embodiment, for example as illustrated in FIG. 5C, the width dimensions of the top and bottom orifices are the same. Fluid exits module 1 at an exit orifice via an internal channel (not shown) that is smaller in diameter than the entrance orifice. Fluid then enters module 2 or module 3, depending on how the assembly is assembled. The sediment filtration module comprises a grating, or mesh, such as a sieve, frit, or synthetic mesh (not shown) of a size effective to collect sediment on the screen while allowing a beverage to flow through. The mesh sizes will depend upon the size and amount of sediment to be filtered. Suitable sediment removal mesh sizes are about 20×20 to about 12×12 (number of openings per linear inch), as disclosed in U.S. Pat. No. 5,829,644, herein incorporated by reference in its entirety. Suitable sediment filters include mesh, paper, cloth, and activated charcoal, as described in U.S. Pat. No. 8,408,251 herein incorporated by reference in its entirety.

Module 2 facilitates sulfite removal from beverages as described herein. As illustrated in FIG. 3, the width dimensions at the top (entrance) 11 and bottom (exit) 12 of module 2 are the same to permit modules 1 and 3 to fit together should module 2 be removed. Removal of module 2 further allows access to the contained resin for cleaning or replacement. In embodiments, as illustrated in FIG. 3, module 2 provides a receptacle (22) defined by the interior of the module, including the non-ionic, solid phase material capable of sequestering free sulfite from the beverage comprising free sulfite, the receptacle having and entrance (not shown) and an exit (not shown) such that the beverage can flow through the receptacle. In other embodiments, module 2 can provide a receptacle including a container, the container enclosing the non-ionic, solid phase material capable of sequestering free sulfite from the beverage comprising free sulfite. The container can be the device disclose herein adapted to be received by the sulfite capture module. The container adapted to be received by the sulfite capture module can be a replaceable cartridge that fits snugly within the receptacle defined by the interior of module 2. The container adapted to be received by the sulfite capture module can be any material that will keep the resin contained therein, including but not limited to, a tea sachet or a non-porous container in which an entrance and exit is provided to allow a beverage to flow through. In embodiments, the entrance and exit can comprise a grating or mesh on two sides (e.g., top and bottom) to allow a beverage to flow through. Module 2 can optionally comprise a frit or sieve at the bottom (exit) (not shown) that will contain any sulfite removal solid phase material that may escape the container adapted to be received by the sulfite capture module, while allowing the beverage to flow through. The frit or sieve can be any material as described herein for the solid phase material housing or sediment capture.

As illustrated in FIG. 3, module 3 is an aeration device with top (entrance) 13 dimensions equal to bottom (exit) 12 dimensions of module 2, and module 2 has top (entrance) 11 dimensions equal to bottom (exit) 14 dimensions of module 1. The bottom (exit) dimensions of the last module in the series (as illustrated that of module 3, 15) may be any dimensions. Similarly, the top (entrance) 10 dimensions of module 1 may be any dimensions.

With respect to aeration module 3, fluid enters through an internal channel that constricts and then widens as it extends toward the exit orifice (not shown). As shown in FIG. 4, one or more air channels 4 extend outward from the fluid channel through the outer housing and are positioned internally near the most constricted point. As fluid passes through the constriction it is mixed with air according to the Bernoulli principle of fluid dynamics, which dictates a reduction in pressure as a function of velocity. One of ordinary skill in the art will recognize that the aeration module uses the Venturi effect to entrain air into wine. Venturi-type devices are well-known in the art. Generally, such devices comprise fittings or tubular structures, and in particular pipe structures that are constricted in the middle and flared on both ends. When a beverage is forced through a constriction point in a tube or pipe the beverage pressure at the constriction is reduced since velocity at that point is increased. Therefore, any air introduced at the constriction point via an inlet is aspirated into the fluid due to the pressure differential. Thus, Venturi devices are frequently utilized to mix or combine a second fluid (e.g., air) with a fluid passing through the device (e.g., wine). Examples of such devices that rely on this principle include those disclosed in U.S. Pat. No. 5,509,349 and U.S. Pat. No. 6,568,660 the teachings of each are herein incorporated by reference in their entirety.

Figure 2:
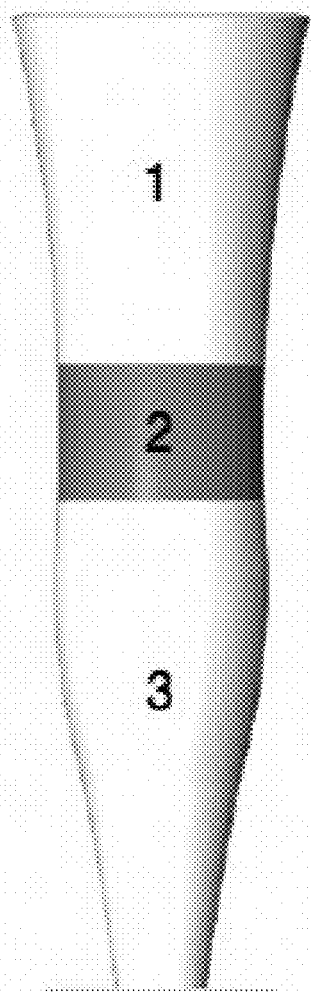
FIG. 2. Contour rendering of FIG. 1.

The dimensions of the various modules are generally as described above, and illustrated in FIGS. 1 and 2, but can be varied, as will be appreciated by one of skill in the art, to suit a particular use or aesthetic preference. Non-limiting examples of various shapes for assemblies including a sulfite capture module (module 1), a sediment filtration module (module 2), and an aeration module (module 3) are shown in FIGS. 5A-F.

Aeration-Oxidation Method for Sulfite Quantitation

The aeration-oxidation method converts free sulfites in a solution to sulfur dioxide and then quantifies the amount of sulfuric acid produced upon exposure to peroxide. The procedure involves the addition of an acid to the sulfite-containing sample and then agitating the sample so that free sulfur dioxide gas gets driven off. The gas will exit the flask and enter the second flask which contains a solution of hydrogen peroxide and a colored indicator (a methyl red/methylene blue indicator solution). As the gas passes through the solution the hydrogen peroxide reacts with the sulfur dioxide to produce sulfuric acid. As a result, the pH of the peroxide solution decreases and the indicator changes color from gray-green to purple. Upon reaching the endpoint of the test, the sulfuric acid solution is neutralized with sodium hydroxide. The amount of sodium hydroxide needed to neutralize the solution correlates to the amount of sulfites originally present in the wine sample.

Equipment used:
Two 125 mL Erlenmeyer flasks;
Two 2-hole #5 stoppers;
One 3-piece glass tubing set;
20" of $3/16$ silicone tubing;
24" of clear $1/8$" tubing;
1 aquarium air pump, including $1/4$" flow regulator valve (TopFin® Air-1000 or equivalent);
One squeeze bulb for pipettes;
One 10 ml syringe;
One 10 ml pipette; and
Two 20 ml pipettes.

Figure 7:
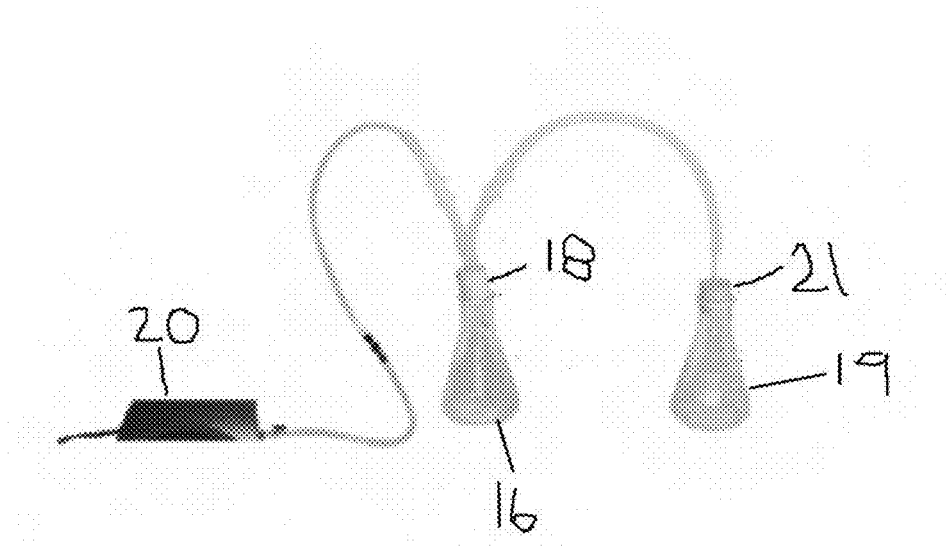
FIG. 7. Representation of the apparatus used for determining the amount of free sulfite in a solution according to the aeration-oxidation method.

The apparatus should be assembled as shown in FIG. 7. The glass tubes will need to be inserted into the two stoppers such that one stopper has both a short and a long tube and the other stopper has only a long tube (the other hole is left open). The pointed tips should face into the flask. The height of each of the long tubes is adjusted so that the pointed tip sits about $1/8$" above the bottom of the flask when the stopper is firmly closed. For the short tube, the exact height placement is not critical.

As illustrated in FIG. 7, the flask having two tubes in the stopper is the sample flask 16. The air inlet from the aquarium pump is connected to the long glass tube and the other end of the glass tube is situated beneath the volume of the sample. The remaining short tube is used as an exhaust and is connected via plastic tubing to the stopper 21 of the receiving flask 19. All inserted connections should be pushed in $3/4$ to 1". The rubber stopper atop the sample flask 16 is removed to allow addition of sample, which is subsequently acidified.

Using the 10 ml pipette, 10 ml of a 3% hydrogen peroxide solution is transferred into the receiving flask 19, which will be stoppered with the stopper having the single glass tube 21 for exhaust. 6 drops of the methyl red/methylene blue indicator solution and 40 ml of distilled water are added to the flask. Hydrogen chloride or sodium hydroxide are added drop wise, if necessary, to reach a solution that is grey in color.

Sample preparation—20 ml of wine sample is transferred via the 20 ml volumetric pipette into the flask that will be stoppered with the stopper having the two glass tubes. The stopper is attached such that the tip of the long glass tube is completely submerged in the wine sample. Using the 10 ml serological pipette, 10 ml of 25% phosphoric acid is transferred into the flask containing the wine sample. The stopper is quickly added.

The pump is turned on and the regulator valve is turned until the wine sample, as well as the hydrogen peroxide solution in the second flask, begins to bubble. The valve is opened until the wine sample bubbles at a slow but steady rate. The test is run for 30 minutes. The pump is turned off and the stopper is removed.

0.01 N Sodium hydroxide is added drop wise into the hydrogen peroxide solution while swirling the flask between drops. The final volume of sodium hydroxide added to the flask to neutralize the solution is recorded. The amount of free sulfite in the solution is calculated according to the equation:

Free sulfite (ppm)=mL NaOH solution×16

Quantofix® Test for Measuring Free Sulfite

The Quantofix® test is a colorimetric determination of the amount of free sulfites in a solution. A glass is filled with a sample. A Quantofix® test strip is dipped into the liquid for one second. The strip is allowed to develop for 30 seconds. After 30 seconds, the strip is compared with the color scale provided on the tube. A salmon color indicates the presence of free sulfite. In acidic solutions like wine and model wine, the sample was buffered with saturating amounts of sodium acetate prior to testing The Quantofix® test strip scale assigns a concentration from 0 mg/L (white/colorless) to 1000 mg/ml (dark red). The intermediate concentrations correspond to shades of salmon/orange red as described in the following table:

| Color | Corresponding Concentration |
| --- | --- |
| White/colorless | 0 |
| Light salmon | 10 |
| Salmon | 25 |
| Dark salmon | 50 |
| Light Orange | 100 |
| Orange | 250 |
| Red/orange | 500 |
| Red | 1000 |

High-Resolution Flow Injection Analysis

The High-Resolution Flow Injection Analysis was performed by ETS Laboratories using an A2LA accredited test, SOP #AO24.

The above described aspects and embodiments can be better understood in light of the following examples, which are merely intended to illustrate the methods and devices, and assemblies and are not meant to limit the scope thereof in any way.

EXAMPLE 1

Preparation of Modified Solid Phase Material by Dialdehyde Treatment

Several food-grade polyacrylate macroporous resins presenting free amine functionality (shown in Table 1, below) were treated with an excess of 5% (v/v) aqueous solution of glutaraldehyde in 20 mM phosphate buffer (pH 8.0) and agitated at room temperature for 15 minutes or 60 minutes before rinsing extensively with at least 10 volumes of water by passing the water over the resin material in a fritted tube. Resin was rinsed with ethanol to assist desolvation and dried in air. Extent of amine functionalization with glutaraldehyde was assessed by boiling for 10 minutes a sample of treated solid phase material in an ethanolic solution of ninhydrin and monitoring a color change of the resin, which would indicate an incomplete conversion of amines. Functionalization was determined to be complete in most instances after 60 minutes of exposure to the glutaraldehyde solution.

TABLE 1

| Purolite ® Resin | Description | Surface Area (m²/g) | Pore Diameter (Å) | Colorimetric Test for Amines | |
| --- | --- | --- | --- | --- | --- |
| | | | | 15 min Treatment | 60 min Treatment |
| 8310M | Amino C2 Acrylate | >70 | 850-1200 | positive | negative |
| 8417M | Amino C6 Acrylate | >50 | 1600-2200 | positive | negative |
| 8405M | Amino C6 Acrylate | >40 | 450-850 | positive | negative |

Thus, Example 1 shows that dialdehyde treatment successfully removed amine functionality from to the surface chemistry of the commercial solid phase material polyacrylate macroporous resins presenting free amine functionality to provide non-ionic, solid phase material according to the disclosure. If the solid phase material retained the amine functionality, the colorimetric test for amines would have indicated positive, as demonstrated by a color change from taupe to blue. Solid phase materials were successfully carbonyl-functionalized as shown by the reduction in sulfite content from sulfite solutions in later examples. Example 1 further demonstrates the conversion of an amine-functionalized ionic resin to a non-ionic carbonyl-functionalized solid phase material capable of covalently adsorbing sulfite.

Example 1 further demonstrates that the solid phase material and/or the carbonyl groups do not revert to amino functionality by chemical leaching from the solid phase material into the solution being passed through the resin (e.g., water, ethanol). If leaching occurred, the test for amines after 60 minutes of treatment would test positive upon continued heating, and this was not observed.

EXAMPLE 2

Sulfite Removal from Model Wine

A model wine solution comprised of 12% ethanol and 30 mM tartaric acid (pH 3.6) was supplemented with sodium metabisulfite (100 ppm) and analyzed by the aeration-oxidation method for sulfite quantitation to achieve a standard curve. Differing amounts of carbonyl-functionalized acrylate resin Purolite® 8310M, as prepared in Example 1, were added to 50 mL volumes of model wine solution (control) having a sulfite concentration of 100 ppm, stirred, and removed by filtration. Sample exposure to the non-ionic solid phase material was limited to 1 minute or total contact time. The filtrate was analyzed for free sulfite content, shown in Table 2, below, using the aeration-oxidation method described above.

TABLE 2

| Sample | Free Sulfite (ppm) |
| --- | --- |
| Control (no resin) | 100 |
| 167 mg | 45 |
| 333 mg | <10 |

Thus, Example 2 shows that the food-safe, non-ionic, solid phase material of the disclosure is capable of removing free sulfites from a model wine solution, and that removal of free sulfite is linear as a function of food-safe, non-ionic, solid phase material quantity. Example 2 further demonstrates a free sulfite sequestration capacity of about 0.257 meq/g for non-ionic, solid phase material of the disclosure, when the solid phase material is submerged in the beverage containing free sulfite for 1 minute with constant stirring.

EXAMPLE 3

Preparation of Modified Solid Phase Material by Dialdehyde Sucrose Treatment

Amino acrylate resin (Purolite® 8310M) was treated with a 50% solution of dialdehyde sucrose in a buffered phosphate solution of pH 8, 9.5, or 11 for three hours at room temperature. The treated resin was rinsed thoroughly with water and dried as in Example 1. The ninhydrin colorimetric test for amines, as described in Example 1, indicated partial carbonyl-functionalization at pH 8 and 9.5, which was visualized as an incomplete color change to blue for these samples. Complete resin functionalization was observed for the resin prepared at pH 11.

Thus, Example 3 demonstrates preparation of the food-safe, non-ionic, solid phase material of the disclosure through the modification of a commercially available resin with dialdehyde sucrose.

EXAMPLE 4

Sulfite Removal from Model Wine

Food-safe, non-ionic, solid phase material (Purolite® 8310M) as prepared in both Example 3 and Example 1 was exposed as separate 80 mg quantities to 10 mL volumes of model wine supplemented with 50 ppm free sulfite. Following exposure to the food-safe, non-ionic, solid phase material for 1 minute, each volume was separated from the solid phase material by filtration and analyzed for free sulfite content by a Quantofix® colorimetric indicator strip test.

TABLE 3

| Sample | Sulfite Level (ppm) |
| --- | --- |
| Control (no resin) | 50 |
| Dialdehyde sucrose pH 8 | 25 |
| Dialdehyde sucrose pH 9.5 | 25 |
| Dialdehyde sucrose pH 11 | 20 |
| Glutaraldehyde pH 8 | <10 |

Thus, Example 3 demonstrates that the food-safe, non-ionic, solid phase material of the disclosure for removal of free sulfite from a beverage comprising free sulfite can be prepared from dialdehyde sucrose. Example 3 further shows that the glutaraldehyde modified solid phase material is slightly more efficient than the dialdehyde sucrose modified solid phase material and thus a lesser quantity of glutaraldehyde modified solid phase material is required to provide an effective amount of a solid phase material according to the disclosure.

EXAMPLE 4

Optimization of Solid Phase Material Modification Conditions

Food-safe, non-ionic, solid phase material (Purolite® 8405M) was prepared by 30-minute exposure at room temperature to a 4-fold volume of phosphate-buffered (pH 8) aqueous solution of glutaraldehyde at concentrations of 2%, 4%, 8% and 16% (v/v). Following exposure, resin samples were rinsed extensively with water and dried as in Example 1. Portions of the modified solid phase material (167 mg) were added to 50 mL preparations of model wine solution having a free sulfite concentration of 50 ppm, stirred for 1 minute, and separated by filtration. Quantofix® test strip analysis did not indicate an improvement in free sulfite reduction beyond the 8% treatment condition.

Thus, Example 4 shows that the preparation of carbonyl-functionalized solid phase material from a primary amine resin and glutaraldehyde is optimized when the glutaraldehyde concentration is at least 8% during the modification of the original solid phase material.

EXAMPLE 5

Modified Solid Phase Material Stability Upon Exposure to Atmosphere

Food-safe, non-ionic, solid phase material according to the disclosure was formed by functionalizing Purolite® 8310M with an 8% glutaraldehyde solution as described in EXAMPLE 4. The resulting food-safe, non-ionic solid phase material was divided into 333 mg portions, enclosed in heat sealable tea bags. The sachet portions were left exposed to atmosphere and then tested to determine free sulfite adsorption performance at discrete time points, shown below in Table 4. The sachet portions were tested for free sulfite adsorption performance by submerging the sachet in 50 mL of model wine supplemented with 50 ppm free sulfite. In another preparation, 667 mg of the food-safe, non-ionic solid phase material was enclosed in a heat sealable tea sachet and exposed to blowing air at room (ambient) temperature for 6 days prior to analysis. The 667 mg preparation was tested for free sulfite adsorption performance by submerging the 667 mg of solid phase material in 50 mL of model wine supplemented with 50 ppm free sulfite. Sachets were stirred in the sample solution for 1 minute and then removed. Analysis in all cases used Quantofix® indicator strips to detect the capacity of the modified solid phase material to remove free sulfites. Colorimetric amine testing was performed concurrently and no color change was observed, indicating no evidence of degradation in any sample.

TABLE 4

| Sample | Sulfite Level (ppm) | Colorimetric Test for Amines |
| --- | --- | --- |
| Control | 50 | n/a |
| Air Exposed - 3 days | 15 | negative |
| Air Exposed - 7 days | 15 | negative |
| Air Exposed - 14 days | 15 | negative |
| Air Exposed - 48 days | 20 | negative |
| Constant Air Flow - 6 days | <10 | negative |

Thus, Example 5 shows that food-safe, non-ionic, solid phase material according to the disclosure is air stable, which the skilled artisan will recognize is a major concern for aldehydes in general. Example 5 further demonstrates a free sulfite sequestration of 0.105 meq/g for food-safe, non-ionic, solid phase material of the disclosure, when the solid phase material is submerged in the beverage containing free sulfite for 1 minute.

Example 5 further shows that the solid phase material and/or carbonyl groups at the surface thereof do not leach from the food-safe, non-ionic, solid phase material of the disclosure after exposure to the atmosphere for at least up to about 48 days.

EXAMPLE 6

Sulfite Reduction in Wine

Standard pour volumes (150 mL, about 5 oz) of randomly chosen red and white wine were exposed to 333 mg of modified solid phase material as prepared in Example 5. The non-ionic solid phase material of the disclosure was exposed to wine by agitation in a fritted tube for 1 minute. Additional standard volumes from each wine were exposed to a commercially available hydrogen peroxide solution ($SO_2GO$®) as directed for a single glass. $SO_2GO$® is marketed as a means for lowering the levels of free sulfites in wine, without affecting quality or taste. Free sulfite levels were assessed relative to the untreated controls by high-resolution flow injection analysis. Table 5 lists the free sulfite levels in the control samples and treated samples, in ppm.

TABLE 5

| Sample | Untreated | Resin Treated | $SO_2GO$ ® Treated |
|---|---|---|---|
| 2013 Santa Rita Sauvignon Blanc | 16 | 4 | 16 |
| 2012 Serpaia di Endrizzi Serpaiolo | 13 | 6 | 12 |

Thus, Example 6 shows the removal of free sulfite removal from actual wine by the food-safe, non-ionic, solid phase material of the disclosure particularly relative to existing solutions for sulfite removal. Indeed, example 6 further shows that the existing consumer technology ($SO_2GO$® product) is ineffective.

EXAMPLE 7

Sulfite Reduction by Assembled Modular Device

A sealed sachet containing 1.65 g of non-ionic solid phase material according to the disclosure prepared from Purolite® 8405M according to Example 5 was packed into the sulfite capture module of the disclosed modular assembly. Approximately 150 mL of Naked Grape® Pinot Grigio was flowed gravimetrically through the assembled device and collected. A sample directly from the bottle indicated approximately 25 ppm free sulfites, while a sample from the treated flow-through indicated <10 ppm free sulfites, as measured by Quantofix® sulfite test strip detection. Both samples were tasted blindly, and the taster could not distinguish a color, smell, or taste difference between the treated and the untreated samples.

Thus, Example 7 shows the effective removal of free sulfite from a beverage comprising free sulfite by a food-safe, non-ionic, solid phase material according to the disclosure in a housing defining a receptacle according to the invention integrated into a sulfite capture module according to the invention. Example 7 further shows that the treatment of wine with a food-safe, non-ionic, solid phase material according to the disclosure does not affect the organoleptic qualities of a beverage comprising free sulfite.

EXAMPLE 8

Sulfite Removal at Various Sample pH

Solutions of model wine containing 50 ppm free sulfite were prepared according to Example 4 and adjusted to pH 1.5, 3.6, and 5.0. A pH 8.0 solution of phosphate buffer (12% ethanol) was also prepared. Solutions were exposed to dialdehyde-modified solid phase material as prepared in Example 5 by passage through a resin bed containing 170 mg of the non-ionic, solid phase material and then analyzed by Quantofix® sulfite test strips. Effectiveness in model wine improved with increasing acidity, as shown below in Table 6. The trend was inconsistent for the mildly alkaline solution, which was still effectively treated upon exposure to the modified solid phase material.

TABLE 6

| Sample | Sulfite Level (ppm) |
|---|---|
| Control | 50 |
| pH 1.5 Model Wine | 25 |
| pH 3.6 Model Wine | 30 |
| pH 5.0 Model Wine | 40 |
| pH 8.0 Solution | 25 |

Thus, Example 8 shows sulfite removal by the food-safe, non-ionic, solid phase material of the disclosure is effective across a wide pH range and is particularly effective at the natural pH of wine of 2.5 to 4.5.

EXAMPLE 9

Sulfite Removal at Various Sample Temperatures

Solutions of model wine were prepared according to Example 4 and allowed to equilibrate to −3° C., 4° C., 12° C., and 22° C. Each solution sample was briefly exposed in a fritted tube with constant agitation to modified solid phase material, according to Example 8 at the temperature of interest. The solution samples were then brought to room temperature and were analyzed for free sulfite content with Quantofix® sulfite test strips. No change in free sulfite removal efficiency, relative to the amount of free sulfite removed from model wine treated at room temperature was observed for any of the samples.

Thus, Example 9 shows sulfite removal is unaffected by temperature between −3 deg C. (approx. freezing pt of model wine) and ambient temperature.

EXAMPLE 10

Sulfite Removal With Polyacrolein

Commercially available polyacrolein was desiccated overnight at 110° C. 1.0 g of desiccated polyacrolein was added to a 50 mL model wine solution supplemented with 100 ppm free sulfites and stirred. Partial solubilization of the polyacrolein generated an intractable slurry. Analysis of the slurry by the aeration-oxidation method indicated a 50-60% reduction in free sulfites. All attempts to separate the polymer from the model wine solution were unsuccessful. Further attempts to solubilize polyacrolein in order to modify porous resins were also unsuccessful.

Thus, Example 10 shows that while polyacrolein is capable of removing free sulfite from beverages comprising free sulfite, polyacrolein forms intractable slurries on contact with beverages comprising free sulfite. It is believed that such a polyacrolein resin could be enclosed in a porous housing such as a tea sachet or plastic container capable of retaining the solid phase material but allowing a beverage to flow through, and such a device could successfully remove free sulfite from a beverage comprising free sulfite while maintaining the solid phase resin separate from the beverage. However, it is further believed that when sulfite adsorbs to polyacrolein the polyacrolein becomes partially soluble and small polymer chains may be able to escape the sachet into the beverage being treated, thereby making polyacrolein impractical for the removal of sulfites from beverages comprising sulfites.

EXAMPLE 11

Effect of Sulfite Removal Treatment on Beverage pH

Food-safe, non-ionic, solid phase material (Purolite® 8310M) as prepared in Example 8 was exposed for 1 minute as separate 170 mg portions to 50 mL of Yellow Tail® Sauvignon Blanc and Alias® Cabernet Sauvignon. Unmodified Purolite® 8310M (a commercially available weak base ion exchange resin available from Purolite® Corporation, Bala Cynwyd, Pa.) and a commercially available mixed bed deionizing resin (Deionization Resin Mixed Bed available from Windows101, Seattle, Wash.) were also exposed as 170 mg portions to 50 mL of Yellow Tail® Sauvignon Blanc and Alias® Cabernet Sauvignon. The pH of the treated portions were compared to the pH of the untreated wine, as shown below in Table 7. The wines were also exposed to twice the amount of solid phase material required for effective sulfite removal, and the pH values are shown in parentheticals in Table 7.

TABLE 7

| Sample | Untreated | Control - Solid phase material of the disclosure treated | Unmodified weak base ion exchange resin treated | Commercially available mixed bed resin treated |
| --- | --- | --- | --- | --- |
| Yellow Tail Sauvignon Blanc | 3.20 | 3.19 (3.27) | 3.28 (3.38) | 3.09 (2.98) |
| Alias Cabernet Sauvignon | 3.76 | 3.78 (3.82) | 3.85 (3.92) | 3.60 (3.46) |

Thus, Example 11 shows that the food-safe, non-ionic, solid phase material of the disclosure does not appreciably alter the pH of the beverage being treated. Further, Example 11 shows that the food-safe, non-ionic, solid phase material of the disclosure does not alter the pH of the beverage being treated to the extent that the unmodified ion-exchange resin and the commercially available mixed bed resin alter the pH of the beverage being treated.

What is claimed is:

1. A method of removing free sulfite from a beverage comprising free sulfite, comprising:
    providing a non-ionic, solid phase material wherein the non-ionic, solid phase material comprises a polyacrylate based resin, a polyalkylacylate based resin, or a modified styrene based resin having carbonyl groups at a surface of the material and having a higher affinity for sulfite than for non-sulfite components; and
    contacting the non-ionic, solid phase material with a beverage comprising free sulfite, thereby selectively removing free sulfite from the beverage by sequestering the free sulfite on the non-ionic, solid phase material and providing a beverage having a reduced amount of free sulfite and otherwise maintains the general chemical composition with which it started.

2. The method of claim 1, wherein the contacting step comprises allowing the beverage comprising free sulfite to flow through the non-ionic, solid phase material.

3. The method claim 1, wherein the contacting step comprises submerging the non-ionic solid phase material in the beverage comprising free sulfite.

4. The method of claim 1, wherein the amount of resin provided is effective to provide a beverage having a reduced amount of free sulfite having a free sulfite concentration no greater than 10 ppm.

5. The method of claim 1, wherein the contacting of the beverage comprising free sulfite with the non-ionic, solid phase resin does not appreciably alter the pH of the treated beverage having a reduced amount of free sulfite relative to the beverage comprising free sulfite.

6. The method of claim 1, wherein the beverage comprising free sulfite is wine.

7. The method of claim 1, wherein the non-ionic solid phase material is a food-safe solid phase material.

8. The method of claim 1, wherein the carbonyl group at the surface of the material comprises an aldehyde.

9. The method of claim 1, wherein the method provides a beverage having a reduced amount of free sulfite without altering the flavor, color, pH, sedimentation, or chemical makeup of the beverage.

10. The method of claim 1, wherein the non-ionic solid phase material comprises a polyalkacrylate based resin and the polyalkacrylate based resin comprises a methacrylic polymer.

11. A device for the removal of free sulfite from a beverage comprising free sulfite, comprising:
    a container for receiving a beverage comprising free sulfite, said container enclosing a non-ionic, solid phase material comprising a polyacrylate based resin, a polyalkylacylate based resin, or a modified styrene based resin having carbonyl groups at a surface of the material and having a higher affinity for sulfite than for non-sulfite components that is capable of sequestering free sulfite from the beverage comprising free sulfite,
    wherein when the container receives a beverage comprising free sulfite, the non-ionic, solid phase material is contacted with the beverage comprising free sulfite, thereby selectively removing free sulfite from the beverage by sequestering the free sulfite on the non-ionic, solid phase material and providing a beverage having a reduced amount of free sulfite and otherwise maintains the general chemical composition with which it started.

12. The device of claim 11, wherein the container is a porous container such that the beverage comprising free sulfite can flow through the container.

13. The device of claim 11, wherein the container provides a receptacle for receiving the beverage, the receptacle having an entrance and an exit such that the beverage comprising free sulfite can flow through the container.

14. The device of claim 11, wherein the non-ionic solid phase material is a food safe solid phase material.

15. An assembly for the removal of free sulfite from a beverage comprising free sulfite comprising:
    a sulfite capture module and at least one of a sediment filtration module or an aeration module, the sulfite module comprising a non-ionic, solid phase material comprising a polyacrylate based resin, a polyalkylacylate based resin, or a modified styrene based resin having carbonyl groups at a surface of the material and having a higher affinity for sulfite than for non-sulfite components that is capable of sequestering free sulfite from the beverage comprising free sulfite, wherein when the sulfite module receives a beverage comprising free sulfite, the non-ionic, solid phase material is contacted with the beverage comprising free sulfite, thereby selectively removing free sulfite from the beverage by sequestering the free sulfite on the non-ionic, solid phase material and providing a beverage having a reduced amount of free sulfite and otherwise maintains the general chemical composition with which it started.

16. The assembly of claim 15, wherein the sulfite module provides a receptacle including the non-ionic, solid phase material capable of sequestering free sulfite from the beverage comprising free sulfite, the receptacle having an entrance and an exit such that the beverage comprising free sulfite can flow through the module.

17. The assembly of claim 15, wherein the sulfite module provides a receptacle including a container enclosing the non-ionic, solid phase material capable of sequestering free sulfite from the beverage comprising free sulfite, the receptacle having an entrance and an exit such that the beverage comprising free sulfite can flow through the container.

18. The assembly of claim 15, wherein the assembly further comprises the sediment module.

19. The assembly of claim 15, wherein the assembly further comprises an aeration module.

20. The assembly of claim 15, wherein the beverage comprising free sulfite is wine.

21. The assembly of claim 15, wherein the non-ionic solid phase material is a food safe solid phase material.

* * * * *